Oct. 16, 1934.       A. NEHER       1,977,008
AUTOMATIC DIPPING SYSTEM
Original Filed July 8, 1927    2 Sheets-Sheet 1
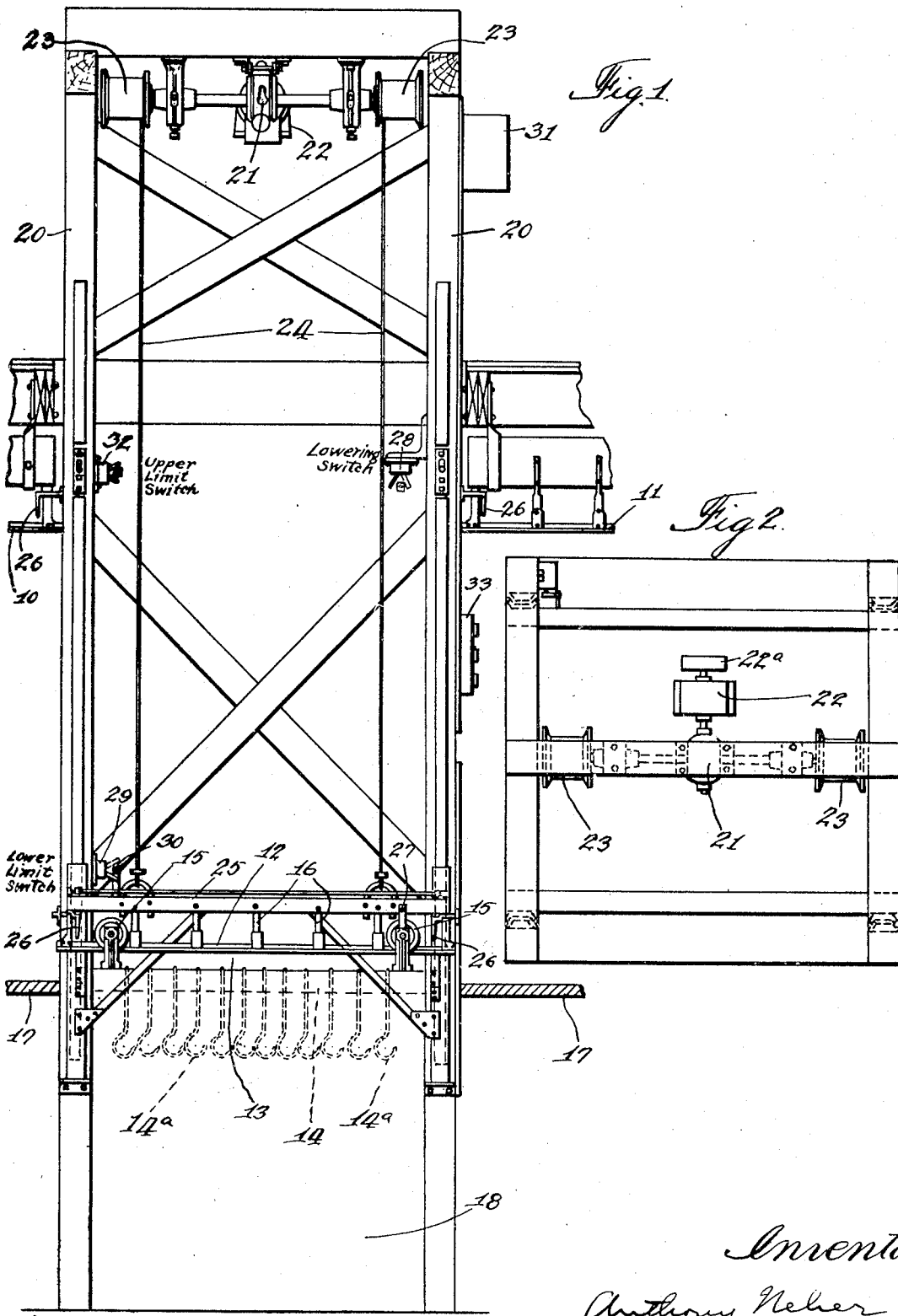

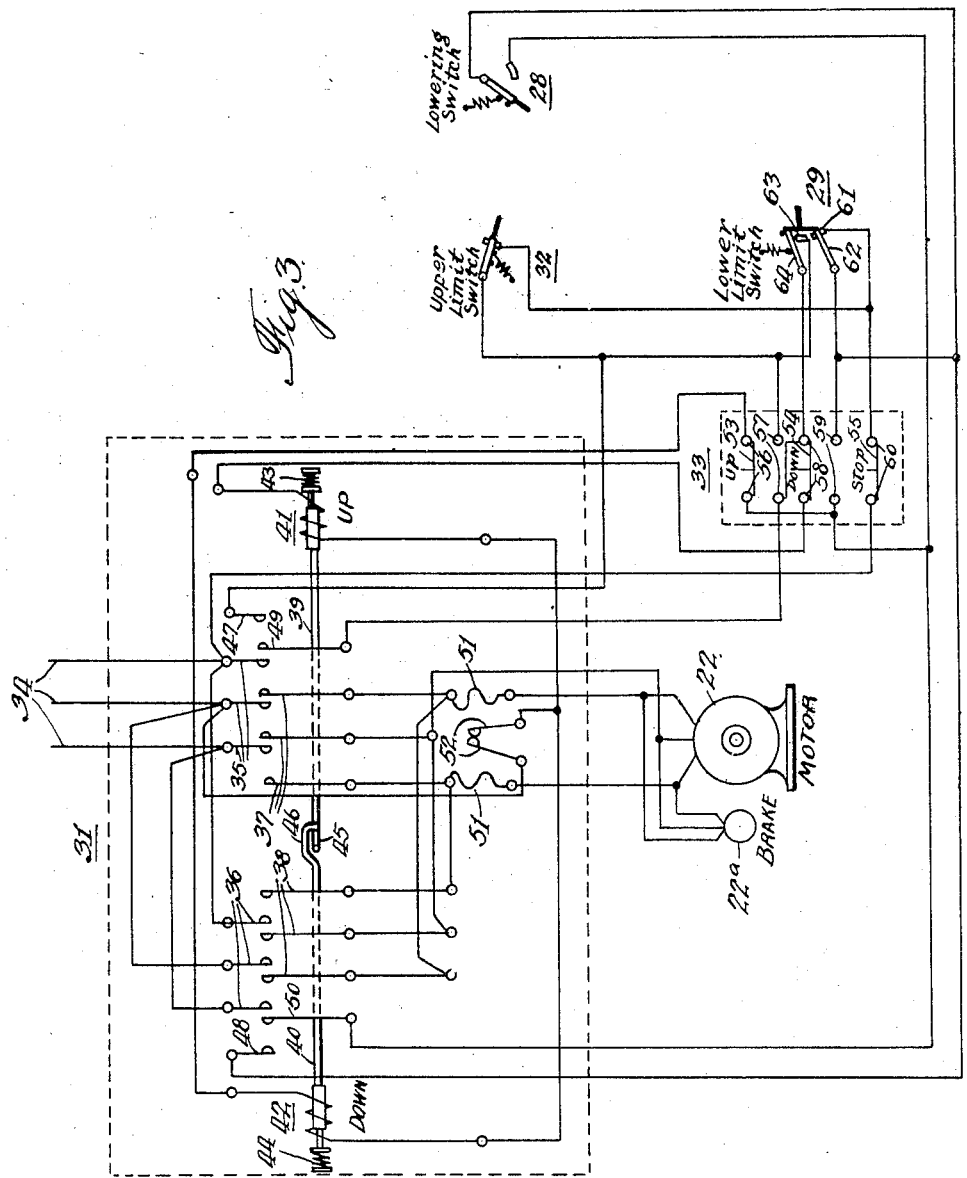

Patented Oct. 16, 1934

1,977,008

UNITED STATES PATENT OFFICE

1,977,008

AUTOMATIC DIPPING SYSTEM

Anthony Neher, Chicago, Ill., assignor to Louden Machinery Company, Fairfield, Iowa, a corporation of Iowa Application July 8, 1927, Serial No. 204,398
Renewed April 15, 1933

9 Claims. (Cl. 214—95)

My invention relates to dipping systems and has particular relation to systems of the character designated, comprising a track-way along which a trolley bearing articles to be dipped may be moved together with a track hoist section upon which said trolley may be placed and which may be verticaly moved to immerse the articles carried by the trolley.

More particularly my invention relates to the provision of such a system in which substantially all of the operations are automatic in character. Such a system comprises initially a track upon which a trolley may be moved by hand or power. One section of such a track is adapted to be moved transversely of the remainder of the track and in the particular example hereinafter more fully described, such track section moves vertically in the manner of a track hoist. The vertical section of the track is movable in columns or guides under the power of a motor, which latter should, of course, be of the reversing type so that the movable track hoist is positively controlled in both its downward and upward movement.

My improved system contemplates the full automatic operation of the track hoist as the trolley is moved thereonto, and at the same time safety devices are provided which insure against another trolley running off of the track when the movable track section is not in line with the remainder of the track. Further, the movable track section itself is provided with automatic operating safety devices which prevent the trolley thereupon from running off either end of the movable track section.

As will be hereinafter more fully described, I utilize a number of standard electric transmitting devices, switches, etc., and combine these instrumentalities in a novel manner with the movable contact section so that the movement of said track section is automatically predetermined to fulfill a special function; in the case hereinafter illustrated the dipping of articles suspended from said trolley into the paint tank or the like. As later described, the trolley upon reaching a predetermined and balanced position on the movable track section, operates a switch to close a circuit and energize a motor to permit said motor to rotate cable drums and allow the movable track section to descend. Immediately upon the descent of the said track section, the track portions are, of course, out of alignment, which event actuates the above indicated safety devices.

The movable track section descends under the influence of the motor until the suspended articles are immersed in a paint tank. At the moment of immersion, or an instant therebefore, the descending track hoist contacts with a limit switch, and I have selected such a limit switch that, although the hoist or upward moving circuit is energized, actual reversal of movement cannot occur until the downward moving circuit is broken. That is, the circuit controlling the downward movement of the vertical hoist is not broken until the circuit controlling the upward movement of the hoist is actually made. The same sequence of operation is utilized in the reversing switch which is used to permit remote control of the hoisting motor. Such combination insures a quick and definite reversal of hoist movement and causes the reversing switch to move from one extreme to the other without returning or pausing in neutral position.

As I will hereinafter point out, any desirable reversing and limit switch having these characteristics may be employed since I am not claiming the particular standard instrumentalities used, but rather I am describing and claiming a new system and function which results from a novel combination of the standard electrical instrumentalities.

After the limit switch has operated in the manner above indicated, the track section is hoisted and the suspended articles are withdrawn from immersion in the paint tank. The track section continues to rise until it is in alignment with other portions of the track. At the instant this event occurs an upper limit switch is encountered by the trolley and the motor circuit broken, whereupon the hoist ceases. Moreover, as the tracks come into alignment, safety features or latches, heretofore referred to, are thrown into inoperative position whereafter the trolley may be pushed off of the hoist section to any desired place, for instance, to a baking oven where the paint on the suspended articles is dried.

In the hereafter description and in the drawings showing my invention, I have not illustrated in detail any of the parts which have heretofore been standard, and in this connection have only indicated the position of the safety latches, it being understod that any safety latch may be used wherein the moving from alignment of the two adjacent track sections causes latches to be set at the ends of each of the sections.

While I have intimated that the above hoist operations are fully automatic, due to the engagement by the trolley with projecting limit switches, I will hereinafter point out that a push button station may be utilized for controlling the same circuits.

Referring now particularly to the drawings, Figure 1 is an elevational sectional view of so much of a track system and a paint tank as is necessary to understand this invention;

Fig. 2 is a top plan view of the hoisting mechanism shown in Fig. 1, and

Fig. 3 is a wiring diagram of the various electrical instrumentalities utilized in controlling the hoisting motor.

Referring now to Figs. 1 and 2, in detail, a conveyor track comprises two stationary sections 10 and 11 between which is a section 12, normally positioned in longitudinal alignment with said sections 10 and 11, which permits the movement thereonto of a trolley 13. The latter is provided with a carrier 14 suspended from trolley wheels 15.

It will be noted that these wheels are of the double type so that the trolley can be moved along the conveyor and pass by hangers 16 which serve to support the track. Suspended from the carrier 14 are a plurality of hooks 14a on which may be hung articles which it is desired to paint by immersion.

As shown, the conveyor track is positioned above the floor 17 and a paint tank 18 is placed below the floor, the upper edge of said tank, however, being sufficiently above the floor level so that dirt and undesirable articles cannot be pushed readily into the tank. Around the paint tank is erected the framing 20 of the track hoist. At the top of the framing is mounted the drum system comprising a standard electrical hoist 21 operated by a motor 22 and having extended drums 23. Cables 24—24 are wound about said drums to either raise or lower the movable track section 12 when the motor 22 is energized in predetermined direction.

As shown, the movable track section 12 is suspended from a cross-member 25, which latter is connected by balanced members to the twin cables 24—24. Positioned at the end of each stationary track portion as well as at both ends of the movable track portion, are elements 26 of an automatic safety device. As heretofore indicated, any automatic safety device may be utilized which is so arranged that the ends of the track are obstructed as soon as the movable track section is displaced from alignment with the stationary track section. Such a system usually comprises a gravity operated member which moves downwardly to obstruct the end of the track as soon as the portions move out of alignment, said gravity operated members being held inoperative or in non-obstructing position by the aligned proximity of the tracks. Since this feature is standard no further description thereof will be given at this time.

Each of the movable trolleys that are to be utilized in my invention is provided with a switch operating member 27 adapted to engage the operating member of a lowering switch 28 that is suitably mounted on the framing 20. The switch 28, as will appear more clearly in the description of the wiring diagram shown in Fig. 3, comprises two normally separated contact members that are adapted to be engaged to complete a circuit therebetween when the operating member of the switch is actuated by the switch operating member 27. The switch operating member 27 and the switch 28 are so positioned that the switch 28 is operated in the manner described when a movable trolley reaches a central position on the movable track section 12. The contact members of the switch 28 are so connected in circuit with the other apparatus utilized in the system as to initiate energization of the motor 22 to cause this motor to permit the drums 23 to pay out the cables 24—24, thus allowing the movable track section 12 and the trolley positioned thereon to descend.

A lower limit switch 29 is secured to the framing 20 in such position as to be engaged by a switch operating member 30 carried by the cross member 25 when the movable track section has reached the desired limit of its downward travel. When the operating member of the limit switch 29 is thus engaged by the switch operating member 30 a circuit controlling the energization of the motor 22 in such direction as to permit downward movement of the movable track section is interrupted and a circuit for initiating energization of the motor 22 in such direction as to raise the movable track section is completed. These contact members are preferably so arranged that the raising circuit is completed before the lowering circuit is interrupted, thus insuring positive and rapid reversal of the motion of the movable track section. As will be described with reference to Fig. 3, a reversing switch 31, which may be secured to the framing 20 adjacent the motor 22, as shown in Fig. 1, is so mechanically interlocked that the raising and lowering power circuits cannot be closed at the same time, although the control circuits for controlling the reversing switch are both energized.

An upper limit switch 32 is also secured to the framing 20 and is disposed in such position that the operating member thereof will be engaged by the switch operating member 30 when the movable track section has been raised to a position in which it is in alignment with the stationary track sections. The limit switch 32 comprises two contact members that are normally in engagement but are adapted to be disengaged when the switch is operated by the operating member 30.

A push-button station 33 may be mounted in any convenient location, as, for example, on the framing 20, to provide for manual control of the motor 22 when it is not desired to utilize the full automatic control. Suitable contact and circuit arrangements for the push button station 33 are shown in Fig. 3 and described in connection therewith.

Referring now particularly to Fig. 3, power conductors 34 are connected from any suitable source of energy to two sets of stationary contact members 35 and 36 of the power reversing switch 31. Two sets of movable contact members 37 and 38 are adapted to be actuated by members 39 and 40, respectively, to cause the movable contact members to engage the corresponding stationary contact members. Electromagnets 41 and 42 are provided for actuating the members 39 and 40, respectively, and springs 43 and 44 are provided for normally biasing these members toward the positions in which the contact members are separated. The adjacent inner extremities of the operating members 39 and 40 are provided with interlocking hooked portions 45 and 46, respectively, to preclude simultaneous engagement of the contact members 37 with the contact members 35 and of the contact members 38 with the contact members 36. Auxiliary stationary contact members 47 and 48 are adapted to be engaged by corresponding auxiliary stationary contact members 49 and 50, which are adapted to be actuated by the operating members 39 and 40, respectively, in the same manner that the contact members 37 and 38 are actuated. The function of these auxiliary contact members will be described presently.

The contact members 35, 37 and 36, 38 are so connected that when the electromagnet 41 is energized to cause the contact members 37 to engage the contact members 35, the motor 22 will be energized in such direction as to raise the movable track section, and when the electromagnet 42 is energized to cause the contact members 38 to engage the contact members 36, the motor 22 is energized in the reverse direction to permit the movable track section to be lowered. Resistor heating elements 51—51 are connected in circuit with two conductors extending from the contact members 37 and 38 to the motor 22 and are placed in juxtaposition with thermostatic contact members 52—52 which are connected in circuit with certain of the control apparatus as hereinafter described to provide overload protection for the motor 22.

The push-button station 33 comprises three manually operable members 53, 54, and 55 designated, respectively, as the "Up", "Down" and "Stop" push-buttons. The push button 53 normally engages a pair of contact members 56 and is adapted to be actuated out of engagement with these contact members and into engagement with a pair of contact members 57. The push-button 54 normally engages a pair of contact members 58 and is adapted to be actuated out of engagement with these contact members and into engagement with a pair of contact members 59. The push-button 55 normally engages a pair of contact members 60 and is adapted to be actuated out of engagement therewith to interrupt the various control circuits, as hereinafter described.

The lower limit switch 29 comprises a stationary contact member 61 that is normally engaged by a movable contact member 62, and a stationary contact member 63 that is adapted to be engaged by a movable contact member 64. These contact members are so arranged that when the movable track section has reached the desired limit of its downward travel, the stationary contact member 63 is engaged by the movable contact member 64 and the stationary contact member 61 is then disengaged by the movable contact member 62. When the movable track section has again started on its upward movement, the operating member of the switch 29 is disengaged by the switch operating member 30 to permit the movable contact members 62 and 64 to return to the positions shown in the drawings.

Turning now to the operation of the system embodying my invention, the lowering switch 28 is closed when a trolley member reaches a central position on the movable track section 12. A circuit is thereupon completed from the middle one of the three power conductors 34 through the thermostatically operated contact members 52, the electromagnet 42, the contact members 56 that are normally engaged by the push-button member 53, the switch 28, the normally engaged contact members 62 and 61 of the lower limit switch 29, and the contact members 60 that are normally engaged by the push-button 55, to the right-hand one of the conducting members 34.

The electromagnet 42 is thus energized to cause the movable contact members 38 to engage the stationary contact members 36, in response to which the motor 22 is energized in such direction as to permit the movable track section to be lowered. At the same time that the contact members 38 engage the contact members 36, the auxiliary contact member 50 engages the auxiliary contact member 48; these two contact members being connected in parallel relation to the contact members of the lowering switch 28. The energizing circuit of the electromagnet 42 is thus maintained after the switch operating member 27 disengages the operating member of the lowering switch 28 to permit the contact members of this switch to be disengaged.

As the motor 22 continues to operate in the lowering direction, the movable track section 12 descends to such position that the articles supported by the hook members 14a are immersed in the paint or other liquid in the tank 18. At the instant that these members are totally immersed, the operating member of the lower limit switch 29 is engaged by the switch operating member 30 to cause the movable contact member 64 of the switch 29 to engage the stationary contact member 63, and then to cause the movable contact member 62 to disengage the stationary contact member 61.

When the movable contact member 64 engages the stationary contact member 63, a circuit is completed from the middle one of the three power conductors 34, through the thermostatic members 52, the operating coil of the electromagnet 41, the contact members 58 that are normally engaged by the push-button 54, the contact members 64 and 63 of the switch 29, the normally engaged contact members of the upper limit switch 32, and the contact members 60 that are normally engaged by the push-button member 55 to the right-hand one of the conductors 34. An energizing circuit for the operating coil for the electromagnet 41 is thus completed between the two right-hand power conductors 34.

The interlocking portions 45 and 46 of the switch operating members 39 and 40 prevent actuation of the contact members 37 into engagement with the contact members 35, however, until the operating coil of the electromagnet 42 is de-energized to permit the contact members 38 to disengage the contact members 36. Such disengagement is permitted as soon as the stationary contact members 61 of the switch 29 is disengaged by the movable contact member 62. The switch operating member 40 thereupon rapidly actuates the contact members 38 out of engagement with the contact members 36 and likewise actuates the auxiliary contact member 50 out of engagement with the co-operating auxiliary contact member 48, by reason of the expansion of the compression spring 44. The interlocking portion 46 of the switch operating member 40 simultaneously disengages the co-operating interlocking portion 45 of the switch operating member 39 to permit the latter member to actuate the contact members 37 into engagement with the contact member 35 and likewise to actuate the auxiliary contact member 49 into engagement with the co-operating auxiliary contact member 47. This actuation is effected by reason of the fact that the operating coil of the electromagnet 41 is energized, as previously described.

During the momentary de-energization of the motor 22 between the time that the contact members 36 are disengaged by the contact members 38, and the time that the contact members 35 are engaged by the contact members 37, the operating coil or coils of a brake 22a that is associated with the motor 22 are also deenergized. The brake 22a may be of any suitable type that is adapted to apply braking effort to the shaft of the motor 22 when the operating coils of the brake are de-energized. Since such brakes are well known in the art, no detailed description thereof will be included herein. The application of the brake 22a causes the motor 22 rapidly to come to rest, and as soon as the motor 22 is energized in the reverse direction in response to the engagement of the contact members 35 by the contact members 37, the brake is released to permit the motor 22 to operate the hoist 21 in such direction as to cause the movable track section to be moved upwardly.

As soon as such upward movement is initiated, the operating member of the lower limit switch 29 is disengaged by the switch operating member 30 to permit the movable contact member 62 of said switch to engage the stationary contact member 61 and to permit the movable contact member 64 to disengage the stationary contact member 63. Disengagement of the contact members 63 and 64 does not interrupt the energizing circuit for the operating coil of the electromagnet 41, however, as these contact members are shunted by the auxiliary contact members 47 and 49, which are now in engagement.

The upward movement of the movable track section continues until it is in alignment with the stationary track sections 10 and 11, at which time the operating member of the upper limit switch 32 is engaged by the switch operating member 30 to cause the contact members of this switch to be disengaged. Disengagement of these contact members interrupts the energizing circuit of the operating coil of the electromagnet 41, thereby permitting the compression spring 43 to actuate the switch operating member 39 in such manner as to cause the contact members 37 to disengage the contact members 35, and likewise to cause the auxiliary contact member 49 to disengage the auxiliary contact member 47. The motor 22 and the brake 22a are thus de-energized and the brake 22a stops the movement of the motor 22 and the hoist 21 to permit the movable track section 12 to remain in alignment with the stationary track sections 10 and 11.

As the movable track section 12 reaches this position, the safety devices 26 are actuated out of the positions in which they obstruct the passage of trolleys along the track sections and the trolley supported by the movable track section and carrying the devices that have just been immersed in the paint or other liquid contained in the tank 18 may be moved off of the movable track section onto the stationary track section 11. All of the apparatus is now in the same condition which was assumed when the description of the operation thereof was commenced, and the same operations may be repeated as desired.

Briefly summarizing the operations that have been described in detail, it will be seen that my invention comprises automatic means operative when a trolley is placed upon a movable track section for causing the movable track section to be lowered to such position that the devices carried thereby are immersed in a tank containing paint or other liquid; that, at the instant of immersion of the articles so carried, the movement of the movable track section and the trolley carried thereby is rapidly reversed by automatic means and the movable track section is actuated upwardly to its original position in alignment with the stationary track section, at which point its movement is automatically stopped.

While I have shown and described one specific embodiment of my invention, it will be understood that various changes and modifications may be made in the circuits and individual devices utilized without departing from the spirit and scope of my invention. Therefore, I desire that my invention be limited only by the scope of the appended claims and the showing of the prior art.

I claim as my invention:

1. In a conveying and dipping system, a substantially horizontal track having a vertically movable section, actuating means for said movable track section, a carriage adapted to be moved along said track, means responsive to the positioning of the carriage on the movable track section for controlling said actuating means to cause the movable track section to be actuated downwardly, means immediately responsive to a predetermined distance of downward travel of the movable track section for controlling the actuating means to reverse the direction of actuation of the movable track section, and means responsive to the upward movement of the movable track section into alignment with the stationary track section for stopping the operation of the actuating means.

2. In a conveying and dipping system, a substantially horizontal track having a vertically movable section, electrical means for actuating said movable track section, a carriage movable along said track, a starting switch actuated by said carriage when the same is positioned on the movable track section to control the electrical means in such manner that the movable track section is actuated downwardly, a reversing switch immediately actuated by the movable track section when the same has descended a predetermined distance to control the electrical means in such manner that the movable track section is actuated upwardly, and a limit switch actuated by the movable track section when the same has been actuated upwardly into alignment with the stationary track section for stopping the operation of the electrical means.

3. In a conveying and dipping system, a substantially horizontal track having a vertically movable section, reversible electrical means for actuating said movable track section, a carriage movable along said track comprising means for supporting articles to be dipped, a vessel containing liquid in which said articles are to be dipped supported below the movable track section, a starting switch actuated by the carriage when the same is positioned on the movable track section to control the electrical means to cause the movable track section to be lowered, a reversing switch actuated by the movable track section when the same has descended to such position that the articles supported by the carriage are immersed in the liquid in the said vessel to control the electrical means to cause the movable track section and the carriage positioned thereon to be actuated upwardly, and a limit switch actuated by the movable track section when the same has been actuated upwardly into alignment with the stationary track section to stop the operation of the electrical means.

4. In a conveying and dipping system, a substantially horizontal track having a vertically movable section, a reversible electric motor for actuating said movable track section, a carriage movable along said track, two switches for controlling the energization of said motor to cause the same to operate in either direction, electromagnetic means for operating each of said switches, a starting control switch actuated by said carriage when the same is positioned on the movable track section to effect energization of one of said electromagnetic means, a holding circuit closed in response to the energization of said one of the electromagnetic means to maintain such energization, a reversing control switch actuated by the movable track section when the same has descended a predetermined distance to effect energization of the other of said electromagnetic means and then to interrupt the said holding circuit, a second holding circuit closed in response to the energization of said other of the electromagnetic means to maintain such energization, and a stopping control switch actuated by the movable track section when the same has been actuated upwardly into alignment with the stationary track section to interrupt said second holding circuit.

5. In a conveying and dipping system, a substantially horizontal track having a vertically movable section, a reversible electric motor for actuating said movable track section, a carriage movable along said track, switches for controlling the energization of said motor to cause the same to operate in either direction, electromagnetic means for operating each of said switches, interlocking means preventing the simultaneous closure of said switches, a starting control switch actuated by said carriage when the same is positioned on the movable track section to effect energization of one of said electromagnetic means, a holding circuit closed in response to the energization of said one of the electromagnetic means to maintain such energization, a reversing control switch actuated by the movable track section when the same has descended a predetermined distance to effect energization of the other of said electromagnetic means and then to interrupt the said holding circuit, a second holding circuit closed in response to the energization of said other of the electromagnetic means to maintain such energization, and a stopping control switch actuated by the movable track section when the same has been actuated upwardly into alignment with the stationary track section to interrupt said second holding circuit.

6. In a control system for a reversible vehicle, a reversible electric motor operatively associated with the vehicle, two switches for energizing said motor to operate the same respectively in opposite directions, electromagnetic means for closing each of said switches, interlocking means preventing the simultaneous closure of said switches, means for maintaining energization of the electromagnetic means for one of said switches to effect operation of said motor to actuate said vehicle in one direction, and means responsive to the actuation of said vehicle in said one direction to a predetermined position for effecting energization of the electromagnetic means for the other of said switches and for subsequently effecting deenergization of the electromagnetic means for said one of said switches.

7. In a conveying and dipping system, a track having a section movable transversely with respect to the remainder of said track, a carriage movable along said track, means operable after said carriage is positioned on said movable track section to move the latter into an operating zone, said carriage remaining on said track section while in said zone, and means for automatically removing said section and carriage from said zone at a predetermined time, said latter means comprising a power device actuated by the contact of said movable track section as it reaches extreme position in said operating zone.

8. In a conveying and dipping system, a track having a section movable with respect to the remainder of said track, a carriage movable at will along said track and onto said movable section, means responsive to the positioning of said carriage on said movable section to cause the latter and the carriage thereon to be moved into an operating zone, said carriage remaining on said movable section while in said zone, and means responsive to the presence of the movable-section, carriage-supporting member in the operating zone for automatically at a predetermined time removing said movable section and carriage together from said zone.

9. In a conveying and dipping system, a track having a section movable with respect to the remainder of said track, a carriage movable at will along said track and onto said movable section, means responsive to the positioning of said carriage on said movable section to cause the latter and the carriage thereon to be moved into an operating zone, said carriage remaining on said movable section while in said zone, and means responsive to the presence of the movable-section, carriage-supporting member in the operating zone for automatically at a predetermined time removing said movable section and carriage together from said zone and for returning them to alignment with another portion of said track to permit the movement of said carriage onto the latter.

ANTHONY NEHER.